United States Patent
Bö

[15] 3,664,433
[45] May 23, 1972

[54] STABILIZER MEANS FOR PLOW WITH STEERABLE TAILWHEEL

[72] Inventor: Isak T. Bö, Randaberg Pa Jaeren, Norway
[73] Assignee: A/S Kyllingstad Plogfabrik, Kleppe, Norway
[22] Filed: June 30, 1970
[21] Appl. No.: 51,228

[30] Foreign Application Priority Data

July 1, 1969 Norway .............................. 2744/69

[52] U.S. Cl. ........................... 172/450, 172/204, 172/282, 172/291, 172/457, 172/678
[51] Int. Cl. ........................... A01b 69/08, A01b 59/06
[58] Field of Search .............................. 172/278–280, 282, 172/285, 286, 290, 291, 257, 445, 450, 457, 501, 678

[56] References Cited

UNITED STATES PATENTS

| 2,687,680 | 8/1954 | Heckathorn et al. | 172/279 |
| 2,690,109 | 9/1954 | Frevik et al. | 172/285 |
| 3,061,020 | 10/1962 | Mannheim | 172/285 |

Primary Examiner—Robert E. Pulfrey
Assistant Examiner—C. W. Hanor
Attorney—Watson, Cole, Grindle & Watson

[57] ABSTRACT

A semi-supportable plough apparatus comprises a frame carrying a number of individual plough beams and having a running wheel mounted at its rear end. A universal pivot structure comprising vertical and horizontal pivots is mounted on the frame for pivotally connecting the latter to the three-point system of a tractor. A transversely extending stabilizer rod is disposed in underlying relationship to the lower side of the draw links of a tractor and a spring mechanism interconnects the stabilizer rod and the pivot structure whereby the tendency of the frame to rotate relative to the tractor links about the horizontal pivot is yieldably limited.

2 Claims, 4 Drawing Figures

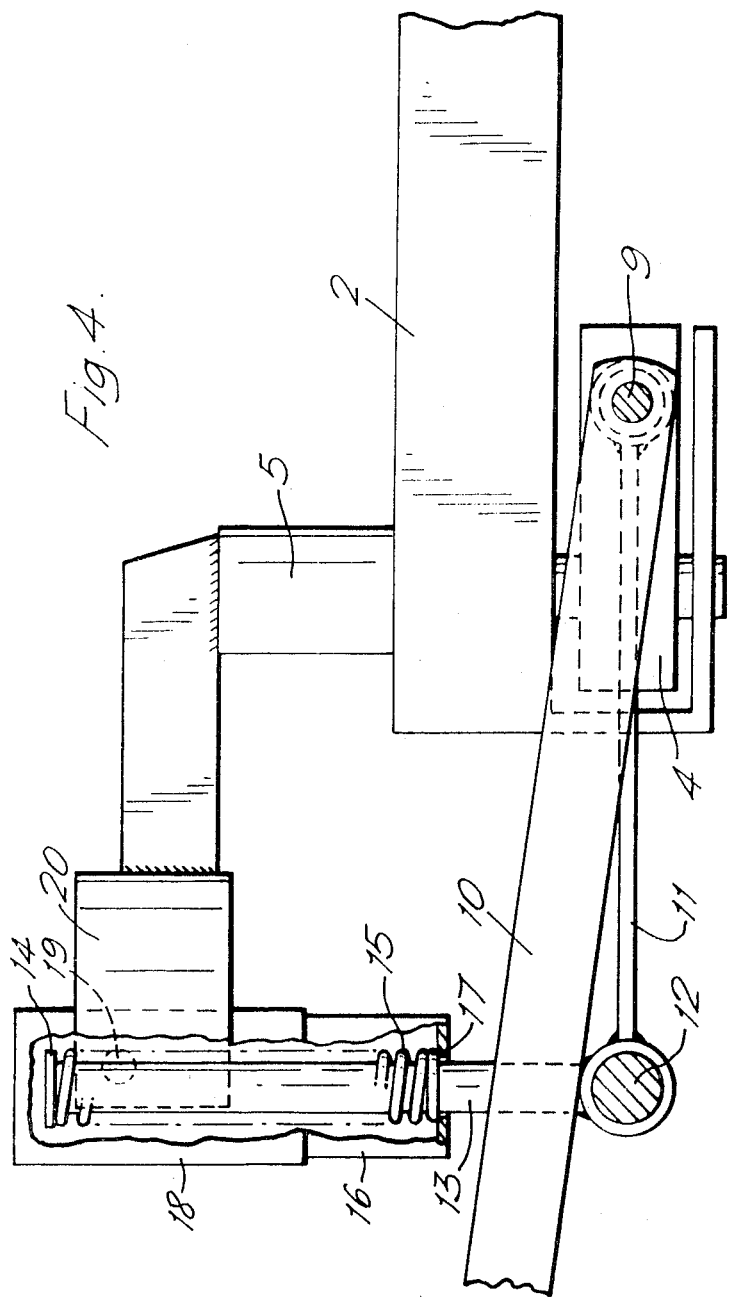

STABILIZER MEANS FOR PLOW WITH STEERABLE TAILWHEEL

The present invention relates to ploughs of the so-called semi-supportable type, i.e., a preferably multi-share plough apparatus comprising a frame which carries the individual plough beams and which is pivotally connectable to the draw and lift links in a three-point system of a tractor and is supported at its rear end by a running wheel. In such apparatuses, the connection between the plough frame and the tractor links usually comprises a universal pivot structure including a horizontal pivot, so that the plough may follow irregularities in the earth surface, and a vertical pivot, so that the plough may turn relatively to the fore-and-aft direction of the tractor. Often the pivot structure is also connected to the running wheel, so as to cause the same to pivot and follow the running direction of the tractor when such direction is varied.

When such universal pivot structures are used to connect a tractor and a plough, there is a risk that the plough frame and the ploughs is carries will over turn backwardly relatively to the tractor when the tractor performs such as abrupt turn that the direction of the axle of the horizontal pivot will extend approximately through the plane of the running wheel.

For the purpose of avoiding such accidents, which waste much time and effort to right the frame, it has been known to attach a spring between the tractor and the universal pivot structure in which the vertical and the horizontal pivots are mounted. Such spring apparatus requires the provision of a particular point of attachment on the tractor itself. Thus, the use of a plough having such a turn-over preventing mechanism requires the use of a tractor which is particularly adapted to be connected to a particular plough, and the attachment and removal of the plough from the tractor is cumbersome.

The present invention relates to a means for preventing the turn-over of ploughs of the type referred to above, in which the spring mechanism is mounted entirely on the plough, so that the plough may be easily connected to any tractor provided with a so-called three-point mechanism which includes a pair of lower draw links. The lower draw links may preferably be hydraulically adjustable in a vertical plane. Specifically, the present invention encompasses a semi-supportable plough apparatus comprising a plough supporting frame having a rear end running wheel and a front mounted connector device for pivotally connecting the frame to a three-point mechanism of a tractor which includes a pair of generally parallel, horizontally spaced draw links extending rearwardly of the tractor. The connector device itself comprises a universal pivot structure which includes vertical pivot means pivotally interconnecting the pivot structure and the supporting frame for relative rotation about a generally vertical axis and horizontal pivot means for pivotally interconnecting the pivot structure and the draw links of a tractor for relative rotation about a generally horizontal axis extending transversely of the path of travel of the tractor. The connector device also includes a frame stabilizer carried by the pivot structure for rotation about the horizontal axis. The stabilizer includes a rod disposed for underlying the draw links of the tractor when the pivot structure and such links are interconnected. Also included in the connector device is a spring mechanism carried by the pivot structure for the rotation therewith about its vertical axis. The mechanism includes a spring member connected to the stabilizer rod for interconnecting the pivot structure and the rod and yieldably limiting relative rotation therebetween about the horizontal axis defined by the horizontal pivot means. Accordingly, the stabilizer rod will cooperate with the draw links to yieldably limit the rotation of the frame about the horizontal axis of the horizontal pivot relative to the draw links.

In such a mechanism, the entire spring system is carried by the plough and the entire connection between the plough and the tractor is made merely by connecting the links with the horizontal pivot. The stabilizer rod is disposed beneath the draw links of the tractor, so that the force transmitting connection between the spring system and the tractor is effective only when it is required to apply a force to resist the turn-over tendency of the plough.

Preferably, the spring mechanism includes a tension adjusting means whereby it is possible to set the initial tension of the spring. This may be of importance in order to adapt the plough for connection to various types of tractors and for adjusting the allowable degree of turn-over of the plough. Specifically, a compression spring may be mounted in a split casing having two parts which are mutually adjustable by means of a screw thread connection.

The accompanying drawings illustrate an embodiment of the invention. The drawings show only such parts of the plough and tractor as are essential to the understanding of the invention. Thus, the plough shares and beams and their connecting members are not shown. Also, the tractor is indicated only by its draw links, in view of the fact that the apparatus of the invention is independent of the tractor to which it is to be applied.

In the drawings:

FIG. 4 is a further enlarged side elevational view of the mechanism shown in FIG. 3.

Figure 1:
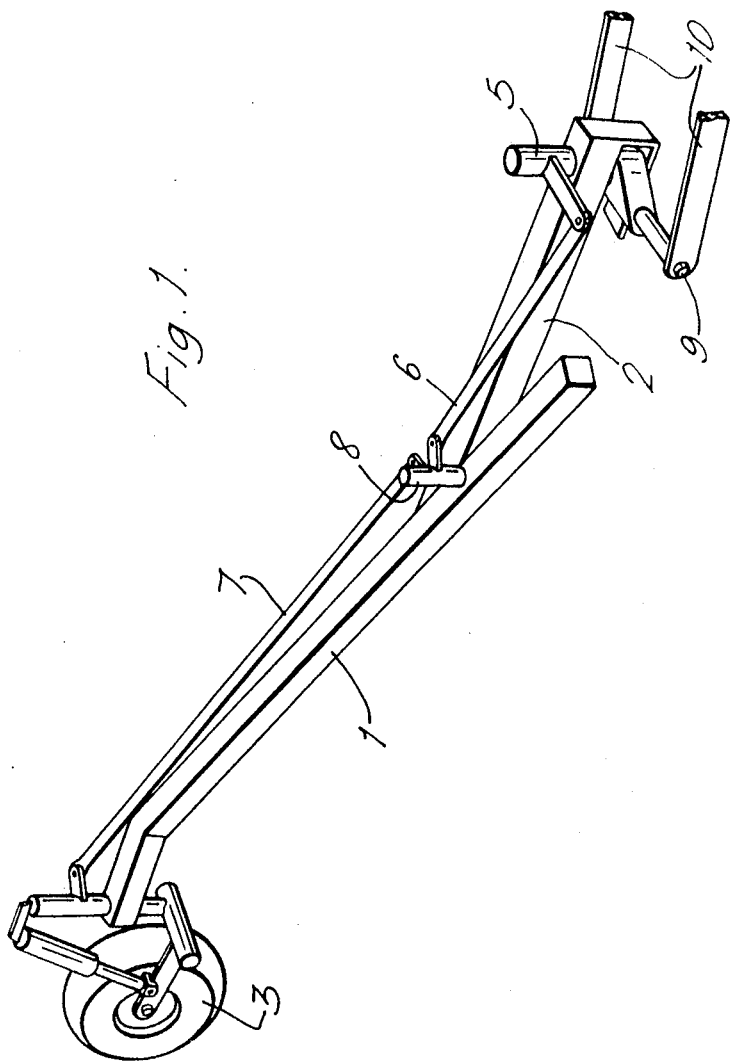
FIG. 1 is a perspective view of a known plough frame and its connecting mechanism in its ordinary operational positions.

In the drawings, the numeral 1 designates a frame for carrying a number of beams of individual plough shares. Frame 1, which in operation extends obliquely rearwardly relatively to the running direction of the tractor, is provided at its front end with a projecting frame element 2, which under ordinary operating conditions extends in the direction of the major axis of the tractor. At its rear end, frame 1 is provided with a running wheel 3. At its foremost end, frame element 2 is connected to a universal pivot structure 4 through the vertical pivot 5 of structure 4. Pivot 5 is also connected to running wheel 3 through rods 6 and 7 and an intermediate pivot member 8, whereby running wheel 3 automatically follows the turning movements performed by the tractor.

Pivot structure 4 also includes a transversely extending, horizontal pivot 9 which, at its opposite ends is connected to the free ends of the draw links 10 of the three-point mechanism of the tractor. The three-point mechanism is preferably hydraulically operated whereby the height of the foremost end of frame 1 may be adjusted.

Figure 2:
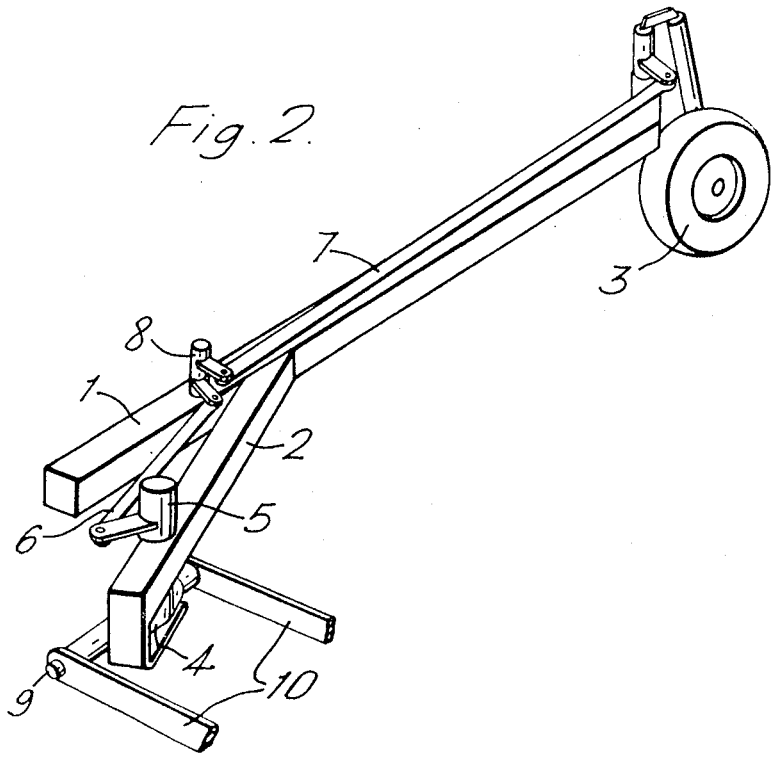
FIG. 2 is a perspective view of the known frame of FIG. 1, with the parts thereof in the position adopted when the tractor is performing an abrupt turn to the left.

By means of pivot 5, running wheel 3, and pivot 9, plough frame 1 will be able to turn in a horizontal plane to follow the running direction of the tractor, and to pivot in a vertical plane to follow the height differences in the field being ploughed. However, when the tractor performs an abrupt turn to the left, as illustrated in FIG. 2, the axis of pivot 9 may extend through the plane of running wheel 3, and then, the entire plough will be free to turn over outwardly and backwardly, since all the ploughs are mounted on the lefthand side of frame 1 in its disposition as seen in FIG. 2. Accordingly, the entire plough is no longer under control. In order to re-establish operational conditions, a tiresome and time consuming effort must be performed.

Figure 3:
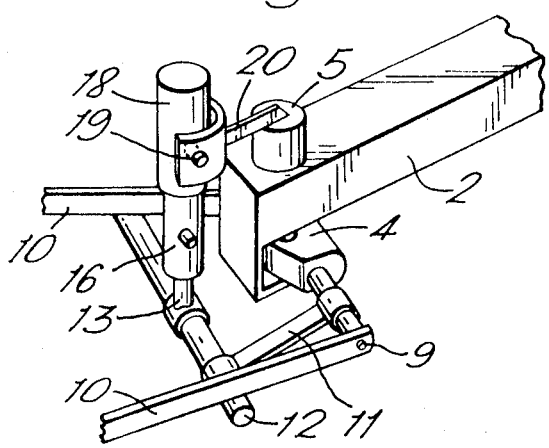
FIG. 3 is an enlarged perspective detail view of the righthand portion of the frame of FIG. 1 in its ordinary operational position which has been provided with a spring loaded stabilizer mechanism embodying the principles and concepts of the present invention.

Such an inconvenient turn-over is prevented by means of the apparatus illustrated by way of example, in FIGs. 3 and 4. The turn-over preventing apparatus comprises a compression spring 15 mounted on pivot 5 and a stabilizer rod 12 disposed beneath he lower side of draw links 10 and carried by pivot 9.

In FIGS. 3 and 4, the same numerals are used to designate elements as are used in FIGs. 1 and 2. In particular, frame element 2, pivot structure 4, and pivots 9 and 5 are combined with the turn-over preventing spring apparatus which is described hereinafter in more detail.

On either side of a pivot structure 4, a forwardly extending arm 11 is mounted on pivot 9. Rod 12 is mounted at the forward ends of arms 11 with its opposite ends engaging the undersides of the draw links 10 of the tractor. A pin 13 is attached at the center of rod 12 and extends upwardly therefrom. A disc 14 is secured at the top end of pin 13 to serve as a stop for spring 15 which surrounds pin 13. Around pin 13 and spring 15 is provided a casing comprising a lower cylindrical part 16 and a top cylindrical part 18 which is in screw thread engagement with the lower part 16. The bottom 17 of part 16 forms a lower support for spring 15. The top part 18 is provided with a set of transversely extending pins 19 which engage a bifurcated arm 20 secured to the top end of pivot 5.

By adjustment of the screw thread connection between casing part 16 and 18, the tension of spring 15 may be correspondingly adjusted, whereby to adjust the pressure of rod 12 against draw links 10 and thereby alter the tendency of frame 1 to swing about the axis of transverse horizontal pivot 9 depending on the oblique position and arrangement of the links 10 of the particular tractor actually connected to the plough.

If the case illustrated in FIG. 2 should arise, a tendency of frame 1 to turn about the pivot 9, i.e., a turn-over of the plough, will cause arm 20 to swing about pivot 9 to press rod 12 harder against draw links 10. Accordingly, spring 15 is compressed to thereby yieldably resist such a turning movement of frame 1.

Since casing parts 16 and 18 may be adjusted relatively to each other to thereby adjust the tension of spring 15, it is possible to fully tension the spring to completely prevent the possibility of turn-over during a lefthand turn of the tractor. Alternately, transverse rod 12 may be brought into light engagement with draw links 10 whereby a further tensioning of spring 15 and a resultant yieldable resistance to the turn-over tendency is automatically obtained when the plough demonstrates a tendency to turn over about the axis of pivot 9 when such axis extends to the plane of running wheel 3.

Obviously, the apparatus of the invention may be formed structurally utilizing means which differ from the specific embodiments illustrated in the drawings. The essential point is that the plough frame itself be provided with a turn-over preventing spring apparatus which, though engagement with the draw links of the tractor, but with no other mechanical connection with any part of the tractor itself, is capable of resisting the rotation of frame 1 and thereby of the ploughs about pivot 9 in case the axis of pivot 9 extends approximately parallel to the direction of frame part 2, so that a turn-over of the plough is prevented when the tractor performs an abrupt lefthand turn.

I claim:

1. A semi-supportable plough apparatus comprising a plough supporting frame having a rear end running wheel and a front mounted connector device for pivotally connecting the frame to a three-point mechanism of a tractor which includes a pair of generally parallel, horizontally spaced draw links extending rearwardly of the tractor, said connector device comprising:

universal pivot structure including vertical pivot means pivotally interconnecting the pivot structure and the support frame for relative rotation about a generally vertical axis and horizontal pivot means for pivotally interconnecting the pivot structure and the draw links of a tractor for relative rotation about a generally horizontal axis extending transversely of the path of travel of the tractor;

a frame stabilizer carried by the pivot structure for rotation about said horizontal axis, said stabilizer including a rod disposed for underlying said links when the pivot structure and links are interconnected; and a spring mechanism carried by said pivot structure for rotation therewith about said vertical axis, said mechanism including a spring member connected to said rod for interconnecting the pivot structure and the rod and yieldably limiting relative rotation therebetween about said horizontal axis whereby said rod will cooperate with said links to yieldably limit rotation of the frame about said horizontal axis relative to the links.

2. A plough apparatus as set forth in claim 1 wherein said spring mechanism includes tension adjusting means coupled with said spring member for adjusting the tension of the latter.

* * * * *